United States Patent
Race

[11] 3,897,903
[45] Aug. 5, 1975

[54] THERMALLY REGULATED CENTRAL HEATING SYSTEM

[75] Inventor: Bernard Claude Race, Pont-A-Mousson, France

[73] Assignee: Pont-A-Mousson S.A., Pont-A-Mousson, France

[22] Filed: Nov. 29, 1973

[21] Appl. No.: 420,349

[30] Foreign Application Priority Data
Dec. 20, 1972 France............................ 72.45401

[52] U.S. Cl................................... 237/8 R; 236/36
[51] Int. Cl............................................. F24d 3/02
[58] Field of Search............ 237/8 R, 56, 59, 62, 63; 236/36 X

[56] References Cited
UNITED STATES PATENTS

| | | | |
|---|---|---|---|
| 2,490,932 | 12/1949 | Thuney | 237/8 R |
| 3,168,243 | 2/1965 | Porland | 237/8 R |
| 3,224,675 | 12/1965 | Fox | 237/8 R |

*Primary Examiner*—William E. Wayner
*Assistant Examiner*—W. E. Tapolcai
*Attorney, Agent, or Firm*—Sughrue, Rothwell, Mion, Zinn & Macpeak

[57] ABSTRACT

A thermally regulated central heating system comprising a hot fluid generator, radiators, a pipe supplying hot fluid between the generator and the radiators, a cooled fluid return pipe between the radiators and the generator, a three-way mixer valve inserted in the hot fluid supply pipe, a mixed fluid circulating pump inserted in the supply pipe between said valve and the radiators, a cooled fluid recycling pipe connecting the return pipe to the mixer valve and means for controlling the closure member of the mixer valve responsive to a differential pressure which is a function of the mixed fluid flow sent to the radiators. The mixer valve divides the supply pipe into a hot fluid supply pipe section and a mixed fluid supply section. The control means is connected by two pressure take-off pipes to points of the mixed fluid supply pipe section located respectively upstream and downstream of a restriction means in said mixed fluid pipe section. A thermostatically controlled flow regulating device is inserted in said mixed fluid supply pipe section.

22 Claims, 18 Drawing Figures

THERMALLY REGULATED CENTRAL HEATING SYSTEM

The present invention relates to a thermally regulated central heating system of the type comprising a hot fluid generator, radiators, a hot fluid supply pipe between the generator and the radiators, a cooled fluid return pipe between the radiators and the generator, a three-way mixer valve inserted in the fluid supply pipe, a pump for circulating the mixed fluid inserted in the supply pipe between the valve and the radiators, and a cooled fluid recycling pipe connecting the return pipe to the mixer valve.

This mixer valve is employed for the thermal regulation or control of the system and for this purpose mixes with the hot fluid a variable amount of cooled fluid taken from the return pipe by way of the branch pipe, this fluid being metered by the closure member of the valve.

The use of such a circuit comprising a mixer valve is motivated by the observation that in simple central heating systems which have no mixer valve and in which the radiators are equipped with thermostatic valves adapted to directly regulate their supply with hot water, these thermostatic valves are insufficient in themselves to ensure a good regulation.

These thermostatic valves act solely on the flow of the water flowing in the radiators. Now, it is well known that, in central heating, regulation systems which act by modulation of the flow through the radiators lack fineness and sensitivity at low pressures. Thus it has been demonstrated that in a correctly calculated heating system during more than 80 % of the heating season, the lift or travel of the closure member of the valve is between one-sixth and 1/20th of the nominal travel, that is to say, between 0.10 and 0.03 mm in the relatively favourable case of a nominal travel of 0.6 mm. With such small travels it is no longer possible to expect obtaining a proportional regulation. The thermostatic valve indeed operates as a on-off system and therefore loses its effectiveness. In such cases, a pumping operation of the valve has been observed which opens and closes alternately whereas the temperature of the water upstream of the valve oscillates substantially.

This is why it has been proposed to act on the temperature of the fluid supplying the radiators by employing a system having a mixer valve of the above-indicated type.

In known systems of this type, for example that described in French Pat. application No. 69-19 709, the mixer valve is controlled by a capsule having a membrane on which acts a differential pressure taken between the inlet and outlet of the circulating pump, the speed of the latter being controlled by a thermostatic means responsive to the temperature of the premises to be heated.

Now, such a thermal regulation is difficult to achieve in a correct manner, since it is governed by a moving member namely the rotor of the circulating pump the speed of rotation of which is itself variable.

An object of the present invention is to provide a central heating system of the aforementioned type having a mixer valve whose closure member is controlled by means responsive to a differential pressure which is a function of the flow of the mixed fluid supplied to the radiators, whose thermal regulation is easier and of higher fidelity and whose assembly is easier and of smaller overall size.

The invention provides a system of the aforementioned type further comprising means controlling the closure member of the mixer valve responsive to a differential pressure which is a function of the flow of the mixed fluid supplied to the radiators, wherein said control means is connected by two pressure take-off pipes to points of the mixed fluid supply pipe section located respectively upstream and downstream of a restriction means in said mixed fluid pipe section and a thermostatically controlled flow regulating device is inserted in said mixed fluid supply pipe section.

Thus, the differential pressure is governed, not by moving means, but by fixed and strong means disposed in the passage of the fluid supplied to the radiators. Consequently, the thermal regulation is easier and of higher fidelity and an advantage is gained as concerns ease of assembly and overall size.

In a particular embodiment of the invention, the thermostatically-controlled flow regulating device comprises a thermostatic valve at the inlet of at least one of the radiators. It is the variation in the opening of the thermostatic valve or valves associated with the radiators which varies the flow in the supply pipe of these radiators and causes a variation in the difference in the fluid pressures measured upstream and downstream of the restriction means and it is to this pressure difference or pressure differential that the mixer valve is responsive.

It is moreover possible to incorporate the restriction means and the two pressure take-offs in the mixer valve and to make the valve, the restriction means, and possibly the control valve means, into a compact assembly.

Further features and advantages of the invention will be apparent from the ensuing description with reference to the accompanying drawings.

Figure 1:
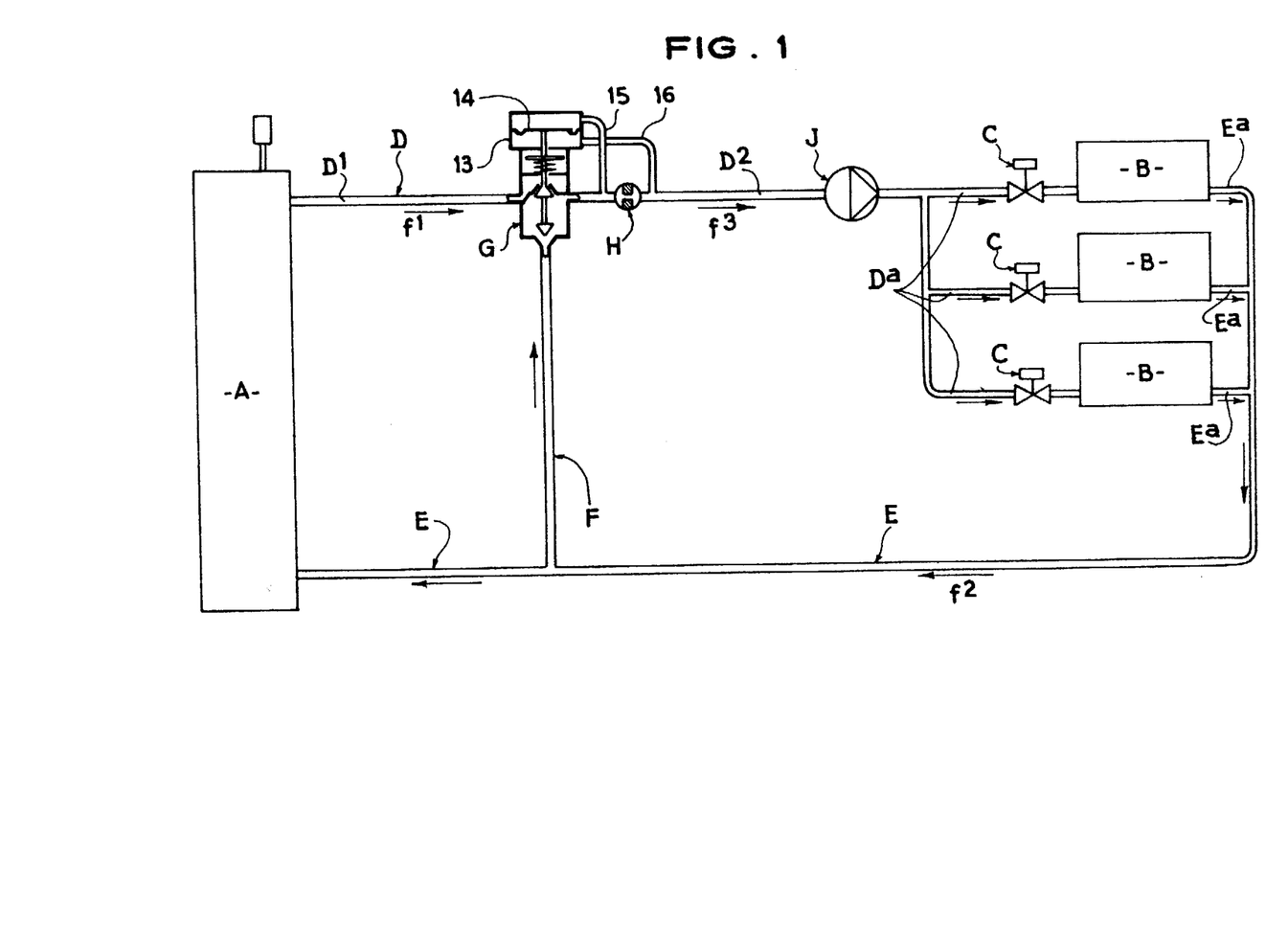
FIG. 1 is a diagrammatic view of a central heating system according to the invention.

The thermally regulated central heating system shown in FIG. 1 comprises a boiler A supplying hot water at constant temperature and radiators B for heating premises. The radiators are each equipped with a valve having a thermostatic control head C responsive to the temperature of the premises in which the radiator is disposed. A hot water supply pipe D connects the upper part of the boiler to each of the radiators by way of branch-connections $D^a$ in which the valves are inserted and a cooled water return pipe E leads from the radiators through branch-connections $E^a$ to the lower part of the boiler. A branch pipe or cooled water recycling pipe F is connected between the pipe E and a three-way mixer valve G inserted in the pipe D between two sections $D^1$ and $D^2$ of the latter. A passage section restriction means H and a rotary circulating pump J are connected between the mixer valve G and the branch-pipes $D^a$. By way of a modification, the pump J may be inserted in the return pipe E upstream of the recycling pipe F.

Figure 2:
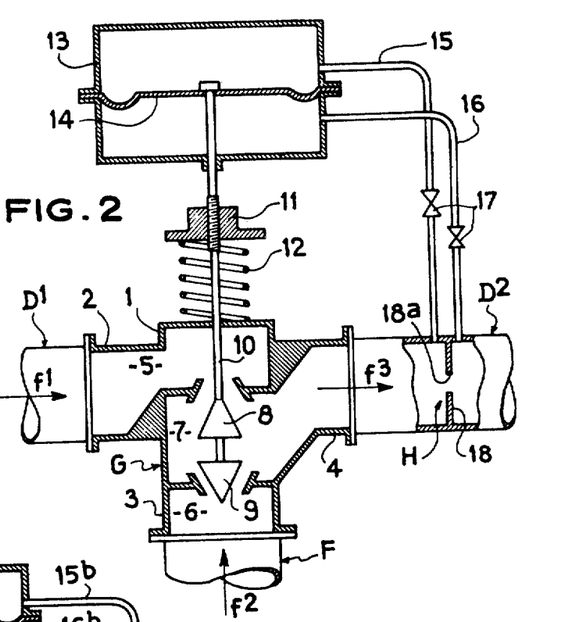
FIG. 2 is a diagrammatic sectional detail view of the assembly of the mixer valve and the restriction means which is here constituted by a diaphragm incorporated in the system.

As shown more particularly in FIG. 2, the three-way mixer G comprises a tubular generally T-shaped body 1 defining three pipe connections 2, 3 and 4 which are respectively connected to the pipe section $D^1$, the pipe F and the pipe section $D^2$, the pipe connection 2 being provided for the supply of hot water, the pipe connection 3 for the supply of cooled water, and the pipe connection 4 for the outlet of mixed water.

The pipe connection 2 communicates with an upper chamber 5, the pipe connection 3 with a lower chamber 6 and the pipe connection 4 with an intermediate or mixing chamber 7 which is separated from the other two chambers by partition walls having openings which afford coaxial seats for two conical valve closure members or poppets 8 and 9 carried by a common rod 10 which forms therewith a moving assembly. In the two extreme positions of this moving assembly one of the openings is opened and the other closed and vice versa. In the intermediate position, the two openings are partly opened and this results in a metered mixture of hot water and cooled water at the outlet pipe connection 4.

The rod 10 extends through the end of the chamber 5 and carries outside the body 1 a nut 11 which is screwed on the rod and bears against a regulating spring 12 compressed between the nut and the body 1. The rod is actuated by a capsule 13 having a membrane 14 integral with the end of the rod 10. The membrane 14 divides the capsule into an upper chamber and a lower chamber into which open respectively a pipe 15 and a pipe 16 for taking off static pressure, in which pipes may be provided stop valves or regulating valves 17.

These pressure take-off pipes 15 and 16 communicate with the pipe section $D^2$ on respectively the upstream and downstream sides of, and in the vicinity of, the restriction means H which is in the presently-described embodiment constituted by a rigid diaphragm 18 which has a centre orifice $18^a$ and is disposed transversely of the pipe section $D^2$.

thus the membrane 14 of the capsule 13 is responsive to the difference in the static pressures prevailing upstream and downstream of the rigid diaphragm 18, this pressure difference or pressure differential being proportional to the square of the velocity and the square of the flow of water in the pipe.

Owing to the hydraulic resistance created by the presence of the rigid diaphragm or restriction means 18, the pressure is lower on the downstream side than on the upstream side of this diaphragm. As a consequence of the pressure exerted by the spring 12 on the rod 10 and therefore on the lower face of the membrane 14, the latter is only in equilibrium for a given pressure difference. If the pressure difference is lower, the membrane 14 rises and causes the moving assembly of the closure members 8 and 9 and the rod 10 to rise therewith; if it is higher, the membrane 14 descends and causes the moving assembly to descend.

The central heating system just described operates in the following manner: With the boiler A operating, the thermostatic valves C open, the pump J operating and the moving assembly of the mixer valve b in an intermediate position shown in FIG. 2, the water flows in the direction of arrow $f^1$ in respect of the hot water, arrow $f^2$ in respect of the cooled water and arrow $f^3$ in respect of the mixed water.

Assuming that it is required to maintain the various premises equipped with the radiators B at a temperature $t$, this temperature is set on the thermostatic head of the valves C. The thermal regulation then operates in the following manner:

If the temperature of the premises increases for some reason (supply of heat to the interior by the heating system or supply of heat from the exterior, for example by the sun) the thermostatic valves C close at least partly. The flow in the pipe section $D^2$ upstream of the mixer valve G decreases. The difference in the static pressure upstream and downstream of the restriction means or diaphragm decreases. This drop in the differential pressure causes the membrane 14 to rise and this raises the moving assembly 8–9–10. The flow of hot water entering the mixing chamber 7 from the chamber 5 decreases, possibly until stoppage, whereas the flow of cooled water entering the chamber 7 increases, possibly to the maximum value.

The temperature of the mixed water supplied to the radiators by the pump J then substantially drops. This effect is added to the direct action of the thermostatic valves which have already caused a decrease in the flow of fluid through the radiator. The complementary action resulting from the variation in the pressure differential therefore also tends to react to a disturbance in the temperature of the premises. Consequently the closure of the thermostatic valves is less than in conventional central heating systems.

Consequently there is less variation in the temperature of these premises under the effect of the disturbance. Moreover, the thermostatic valves operate under better opening conditions. All these results therefore tend toward an improved regulation.

Conversely, if the temperature of the premises drops below the indicated or set value $t$ (cooling due to disappearance of the sun rays and/or cold water or a current or air coming from a door or open window) the thermostatic valves C tend to open still more. The flow of water in the pipe section $D^2$ tends to increase and the difference in the static pressures on each side of the diaphragm 18 and therefore of the membrane 14 also tends to increase. The membrane 14 consequently descends and lowers the moving assembly 8–9–10. The flow of hot water increases and the flow of cold water decreases and the flow of mixed water increases owing to a decrease in the overall resistance of the circuit due to the influence of the thermostatic valves and this mixed water is at a higher temperature which tends to bring the temperature of the premises back to the desired value $t$. As explained hereinbefore, in the case of an increase in the temperature of the premises, this action is added to that of the thermostatic valves. There is also less variation in the temperature of the premises under the effect of the disturbance and an improved regulation.

In this regulating procedure, the action of the mixer valve G depends on variations in the flow through the system under the action of the thermostatic valves C. These flow variations are transmitted to the capsule 13 and furnish to the membrane 14 the energy for moving the moving assembly 8–9–10 of the mixer valve G. Thus this energy is taken off directly from the hydraulic circuit and requires no auxiliary electric energy.

By modifying the stiffness of the spring 12, that is to say by compressing the spring to a varying extend, by means of the nut 11 which is screwed along the rod 10, the mixer valve G is adapted to the heating system. Thus it is arranged that, when the flow in the radiators B is equal to the nominal flow, the mixer valve is wide open to the pipe connection 2 for the supply of hot water and closed to the cooled water pipe connection 3 and that, when the flow in the radiators is nil, the valve is closed to the pipe connection 2 and wide open to the pipe connection 3.

If the compression of the spring 12 is reduced from the initial adjustment, the mixer valve remains partly open to the hot water (pipe connection 2) when the flow of water in the pipe section $D^2$ to the radiators is nil. On the other hand, if the compression of the spring 12 is increased from the initial adjustment, the mixer valve is closed to the hot water when the water flow in the pipe section $D^2$ is not nil.

The adjustment of the spring 12 therefore acts on the travel of the moving assembly 8–9–10 of the mixer valve, on the ratio between the hot water flow furnished by the boiler and the mixed water flow in the radiators and on the temperature of this mixed water which is a function of the ratio of the hot water to the cooled water in the mixture.

This possibility of thermal adjustment by action on the spring 12 is of high interest for central heating systems in which only a part of the radiators is equipped with thermostatic valves. In this case, the thermal regulation is controlled solely as a function of the fraction of the flow corrresponding to the mixed water which flows through the thermostatic valves and it is governed by the latter.

Figure 15:
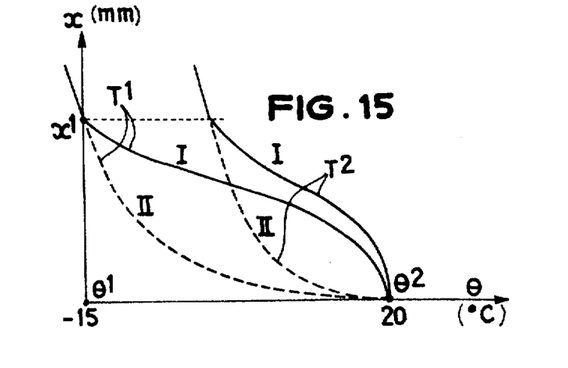
FIG. 15 is a comparative diagram of the operation of a known system equipped solely with thermostatic valves and the operation of a system according to the invention.

The arrangement just described remedies the aforementioned observed imperfections in the operation of systems having solely thermostatic valves as the comparative diagram of FIG. 15 shows. This diagram shows, as absciss$^{ae}$, the temperatures $\theta$ of the premises to be heated expressed in degrees centigrades and, as ordinates, the travels $x$ expressed in millimetres of the closure members of the thermostatic valves C, that is to say the distance they are moved away from their seats. The ordinate $x^1$ represents the nominal travel of the closure members. The absciss$^{ae}\theta^1$ and $\theta^2$ represent the temperatures of the premises of −15°C (base temperature which corresponds to the nominal travel $x^1$) and +20°C. For two temperatures $T^1 = 20°C$ and $T^2 = 60°C$ of the hot water furnished by the boiler, there have been represented in full line the variation in the opening travels of the closure members of the valves in the presently-described system (curve I) and in dotted line the variations in the opening travels in a system of known type in which the thermostatic valves are the only regulating means provided, there being no mixer valve (curves II).

It is observed that in the system of known type (curve III) the opening travel of the closure members of the valves decreases very rapidly as soon as the temperature of the premises increases from the base temperature. Under these conditions, during the major part of the heating season the opening travel of the thermostatic valve closure members will be extremely small. With such a small travel it becomes very difficult to achieve a proportional regulation. The thermostatic valves operate in an on-off manner and thus lose their effectiveness.

In the system according to the invention (curve I) it is observed that the opening travel of the closure members of the thermostatic valves remains large even when the temperature of the premises increases substantially with respect to the base temperature. The thermostatic valves therefore operate under much better conditions and they retain their effectiveness throughout the range of effective variation in the temperature of the premises and consequently the system surprisingly ensures more benefit to be derived from the thermostatic valves C.

The system just described is very simple. It may be constructed by simply adapting a known system having merely thermostatic valves. It is sufficient to add a three-way mixer valve G and a restriction means H and connect the pressure take-off pipes 15 and 16 which control the capsule 13 of the valve on the upstream and downstream of the restriction means H. The adaptation may even be carried out in two stages: first a manually controlled mixer valve without a capsule 13 and the restriction means H are mounted and then the capsule 13 and the pressure take-off pipes 15 and 16 are connected.

The multiple thermostatic valves C which control respectively the various radiators B have the advantage over a single ambiance thermostat which would control the mixer valve G of reacting separately in accordance with needs of the premises in which the radiator is located and not as a function of a single reference premises as occurs with a single thermostat which is difficult to position so as to avoid the influence of local and temporary variations in temperature (drafts, sun rays). It concerns an independent system which requires no electrical connection to any apparatus in the region where the boiler is located or outside this region.

Figure 3:
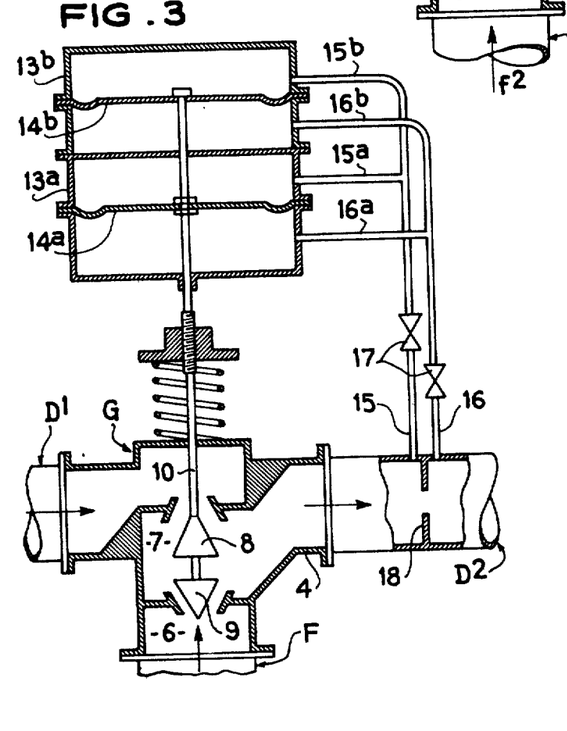
FIG. 3 is a view of a modification of the valve control means.

In the modification shown in FIG. 3, the rod 10 of the moving assembly of the mixer valve is integral with two membranes $14^a$ and $14^b$ pertaining to two superimposed capsules $13^a$ and $13^b$ which are supplied in parallel respectively by branch connections $15^a$–$16^a$ and $15^b$–$16^b$ of the take-off pipes 15 and 16.

Figure 4:
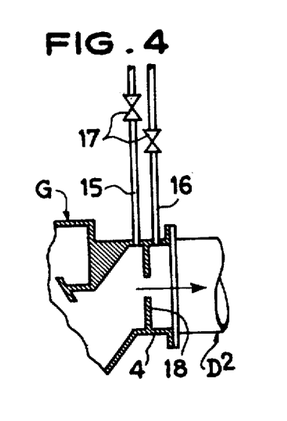
FIG. 4 is a partial view of a modification of the valve shown in FIG. 2 in which the diaphragm is incorporated in this valve.

In the modifications shown in FIG. 4, the diaphragm 18$^a$ is not mounted in the pipe section D$^2$ but in the pipe connection 4 corresponding to the outlet of mixed water. In this case, the mixer valve forms a compact assembly with the capsule 13 the restriction means or diaphragm 18$^a$ and the pressure take-off pipes 15 and 16.

Figures 5, 6:
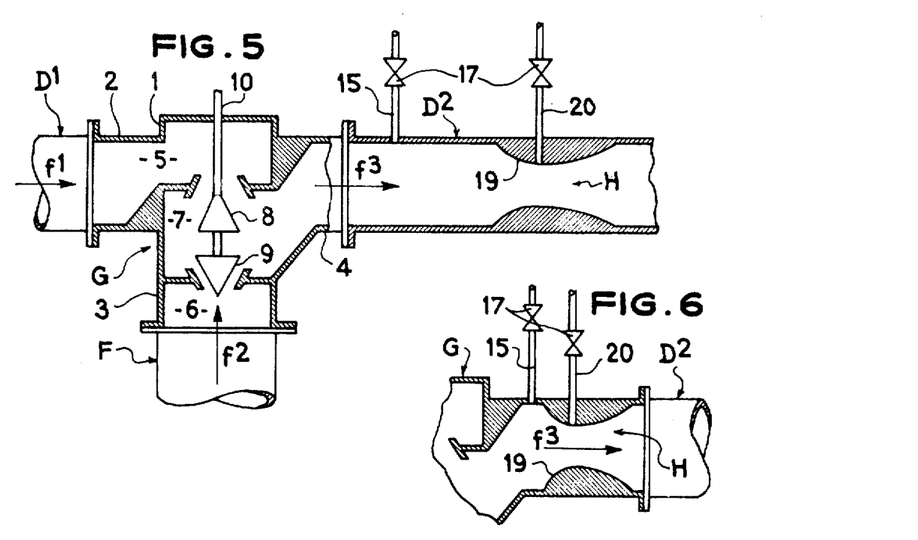
FIG. 5 is an assembly view similar to that shown in FIG 2 in which the restriction means is constituted by a venturi.
FIG. 6 is a view corresponding to FIG. 4 in respect of the embodiment shown in FIG. 5.

In the modification shown in FIG. 5, the restriction means H is constituted by a venturi 19 disposed in the pipe section D$^2$ in the vicinity of the mixer valve G and the downstream pressure take-off pipe 16 is replaced by a pressure take-off pipe 20 located at the venturi throat, that is to say, in the region where the section of passage is the smallest. The advantage of the venturi over the diaphragm 18 is that it gives for a given pressure drop a higher pressure difference between the pipes 15 and 20 and consequently renders the action of the capsule 13 and of the mixer valve G more responsive to a given temperature variation to which the thermostatic valves C are subjected. Thus high differential pressures are obtained in the capsule 13 without a marked pressure drop with respect to that of the whole of the circuit.

In the modification shown in FIG. 6, the venturi 19$^a$ is mounted in the outlet pipe connection 4 of the valve and this constitutes a compact assembly as in the arrangement shown in FIG. 4.

Figure 7:
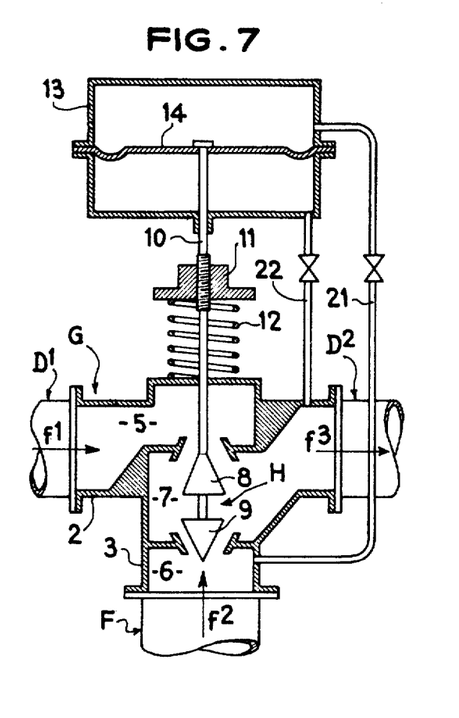
FIGS. 7, 7a, 8 and 9 are views of various modifications of mixer valves in which the pressure take-offs are incorporated.
Figure 7A:
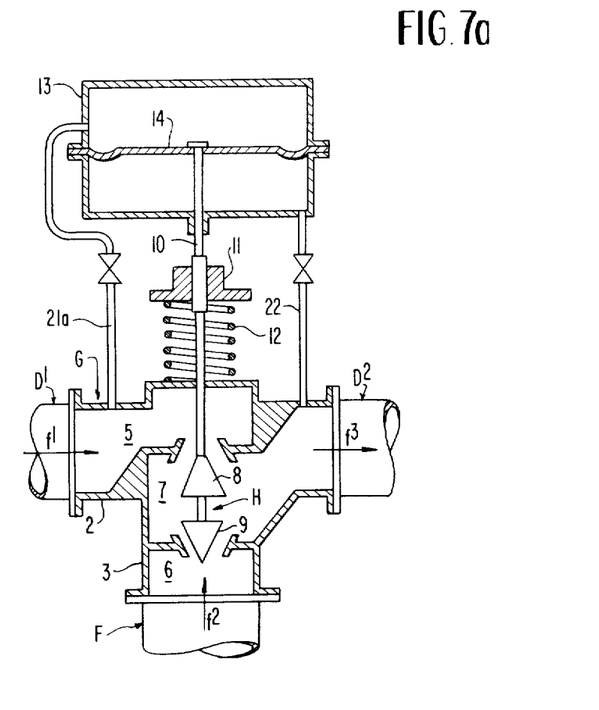

In the modification shown in FIG. 7, the restriction means H is constituted by the moving assembly 8–9–10 of the mixer valve itself in combination with the seats of the closure members 8 and 9. The pressure take-off pipes 21 and 22 leading from the capsule 13 communicate respectively with the pipe connection 3 and the pipe connection 4 of the valve. The pipe 21 may also be replaced by a pipe 21$^a$ which communicates with the pipe connection 2 of the valve as shown in FIG. 7$a$.

In these two arrangements, there is employed the intrinsic resistance of the valve to the flow of water. There appears a pressure difference between the upstream and downstream sides of the valve and it is this pressure difference — function of the resulting flow by way of the pipe connection 4 and which increases with this flow — which is utilized for displacing the capsule controlling the valve. According to the chosen construction, the evolution of the pressure difference is slightly different in accordance with the flow through the pipe connection 4.

If there is required above all large forces on the capsule 13 for large values of the ratio : flow of hot fluid from the boiler/flow of mixed fluid supplied to the radiators, the arrangement including the pipes 21 and 22 is chosen. On the other hand, if it is preferred to retain forces which are still acceptable for low values of the considered ratio, the arrangement of pipes 21$^a$ and 22 is chosen, as shown in FIG. 7$a$.

The modifications shown in FIGS. 7 and 7$a$ have the advantage over the foregoing arrangements of not creating an additional pressure drop in the system.

Figure 8:
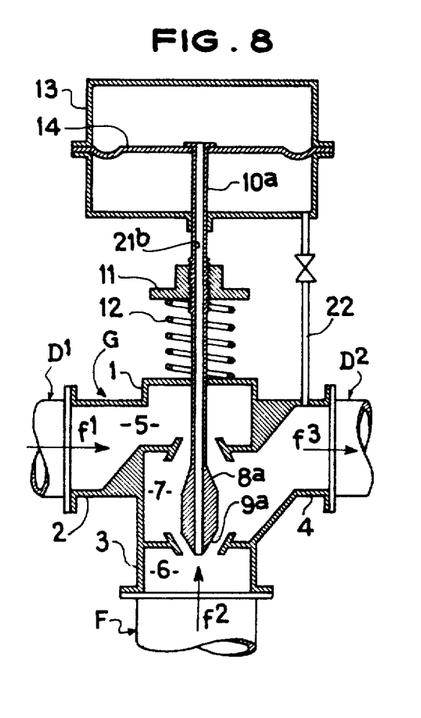

In the modification shown in FIG. 8, the pressure take-off pipe 21 is replaced by an axial passage 21$^b$ inside the rod 10$^a$ of the moving assembly 8$^a$–9$^a$–10$^a$. This passage 21$^b$ opens out, at its upper end, above the membrane 14 whose rod 10$^a$ is integral with the membrane and, at its lower end, in the cooled water inlet pipe connection 3 after having passed through the valve closure members 8$^a$ and 9$^a$ which are here interconnected by a cylindrical portion.

Figure 9:
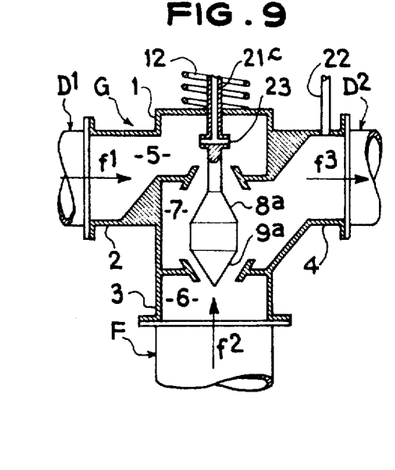

In the modification shown in FIG. 9, the inner pressure take-off pipe 21$^c$ does not extend through the closure members 8$^a$ and 9$^a$ but stops above the closure member 8$^a$ and communicates above the latter with the upper chamber 5 of the hot water inlet pipe connection 2 by way of one or more pressure take-off orifices. This inner conduit 21$^c$ having orifice 23 is therefore equivalent to the pipe 21$^a$ shown in FIG. 7$a$.

Figure 10:
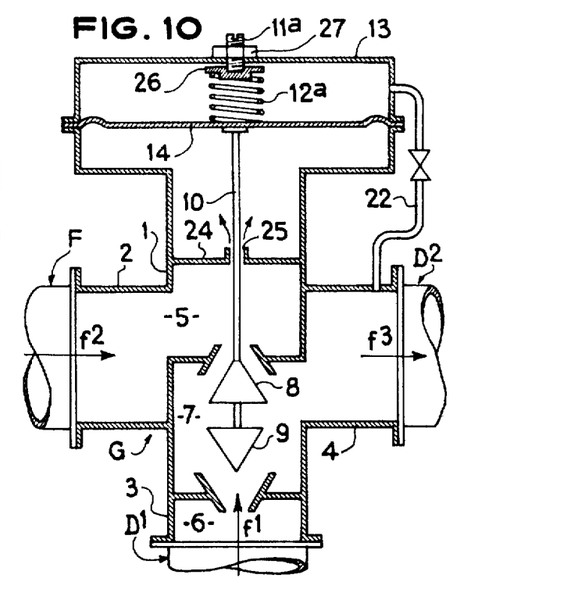
FIGS. 10 and 11 are views of other modifications of the mixer valve in which the control means and one of the pressure take-offs are incorporated.

In the modification shown in FIG. 10 there is eliminated from the arrangement shown in FIGS. 7 and 7$a$ the pressure take-off pipe 21 or 21$^a$. For this purpose, the housing of the capsule 13 and the valve body 1 are rendered integral so as to define a common intermediate partition wall 24 which separates the lower chamber of the capsule 13 from the upper chamber 5 of the mixer valve. These two chambers communicate by way of an opening 25 which is formed in the partition wall 24 and defines an annular gap or passage around the rod 10 of the moving assembly of the valve. In this embodiment, the valve is not connected in the same way as in the foregoing arrangements to the hot water pipe D and the cooled water pipe F. It is the lower chamber 5 which is connected to the boiler by way of the hot water pipe section D$^1$ and the upper chamber 6 which is connected to the cooled water pipe F. The intermediate chamber 7 is still connected to the mixed water pipe section D$^2$. This arrangement is still more compact than the foregoing arrangements, since the control capsule is unitary with the mixer valve.

Figure 11:
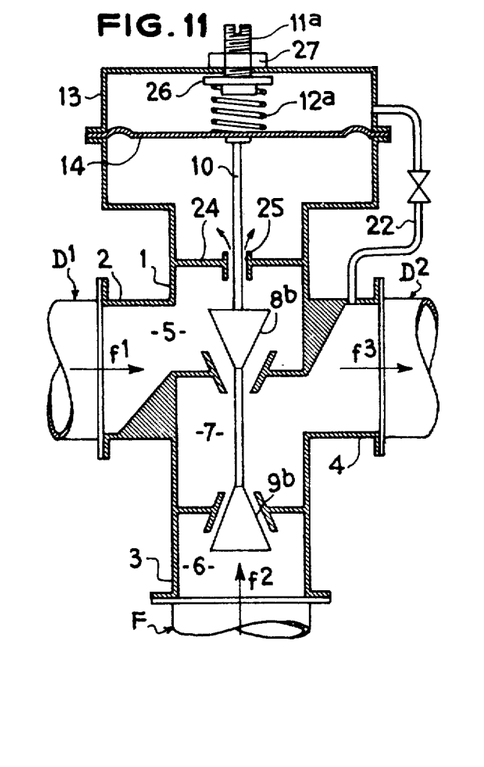

The same is true of the modification shown in FIG. 11. However, in the latter, the closure members 8$^b$ and 9$^b$ are respectively disposed in chambers 5 and 6 and not both in the intermediate chamber 7 as the valves 8 and 9, and they bear against seats which face in opposite directions in separating partition walls. In contradistinction to the arrangement shown in FIG. 10, the valve is connected to the hot water and cold water pipes in the usual manner, that is to say, as in the arrangements shown in FIGS. 2–9. The fluid reaches the closure members in the direction opposed to the usual direction, but, as the pressure drops are low, this has no adverse effect.

The modifications shown in FIGS. 10 and 11 enable the stuffing box or sealing arrangements to be avoided which, although not shown, are necessary in the embodiments shown in FIGS. 2–9 in the region of the passage of the rod 10 through the valve body and in the capsule. This reduces the forces to overcome to shift the membrane.

In the two embodiments shown in FIGS. 10 and 11, instead of providing a spring 12 compressed between the membrane 14 and the valve body 1 for regulating the moving assembly there is provided a regulating spring 12$^a$ disposed inside the upper chamber of the capsule and compressed between the membrane 14 and a washer 26 which is integral with a screw 11$^a$ which has a split head and is screwed in a nut 27 integral with the wall of the capsule. The regulation of the compression of the spring 12$^a$ is very easy, since it is achieved by acting on the head of the split screw 11$^a$ located outside the capsule in the open.

Figure 12:
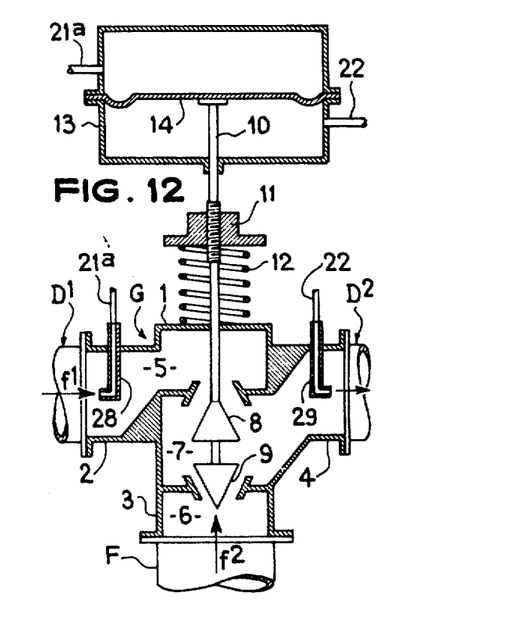
FIG. 12 is a view of a modification of the mixer valve similar to that shown in FIG. 7 with incorporated dynamic pressure take-offs.

The modification shown in FIG. 12 is similar to the second version of the arrangement shown in FIG. 7 except that the pressure take-off pipes 21$^a$ and 22 terminate in total pressure take-off tubes 28 and 29, the orifice of the tube 28 facing in the upstream direction on the axis of the pipe connection 2 and that of the tube 29 facing the downstream direction on the axis of the pipe connection 4. Thus, the dynamic pressure of the water is employed to reinforce the fluid pressure exerted by this water on the membrane 14 owing to an additional active pressure differential on the membrane 14 of the capsule.

Figures 13, 14:
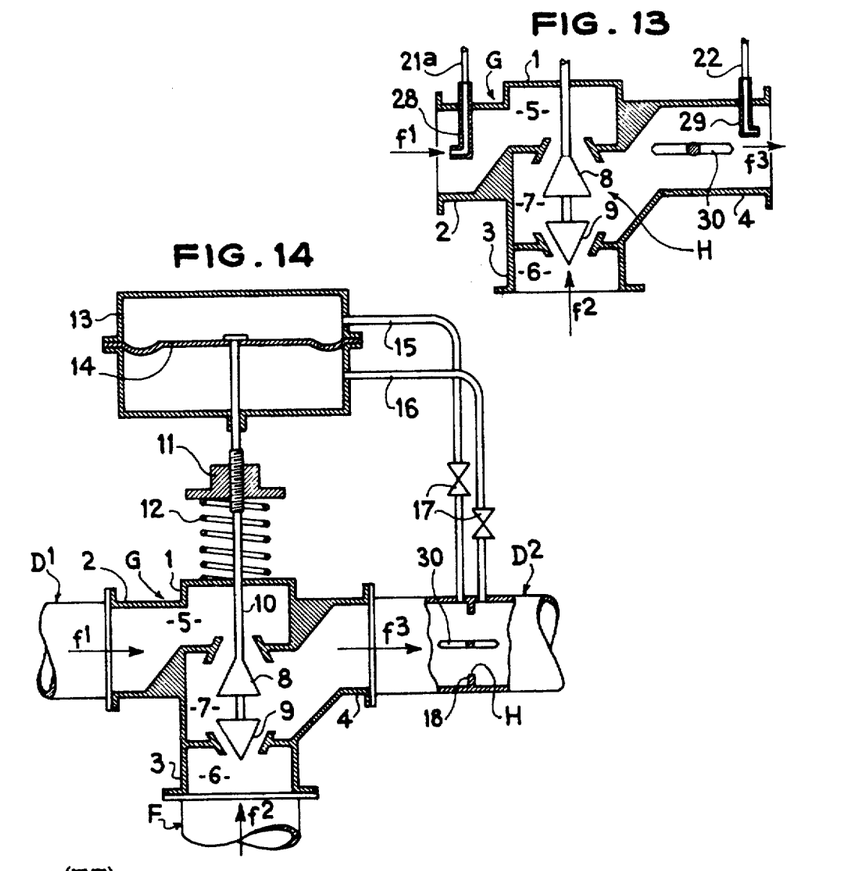
FIGS. 13 and 13a are views of a modification of a mixer valve or a flap similar to that shown in FIG. 12 with an incorporated restriction means constituted by a butterfly-valve.
FIG. 14 is a modification of the embodiment shown in FIG. 13.

It is possible to adjust the differential pressure or difference in the pressure on each side of the restriction means H, measured through the pipes 15 and 16, 21 and 22 or 21$^a$ and 22, by means of the embodiments shown in FIGS. 13 and 14.

In the embodiment shown in FIG. 13, an adjustable butterfly valve member 30 is mounted in the outlet pipe connection 4 of the mixer valve G between the closure members 8–9 and the pressure take-off pipe 29. By closing the butterfly valve member 30 to a varying extent the pressure differential is varied and acts on the membrane 14 of the capsule 13 for a given flow in the current of the radiators B.

In the embodiment shown in FIG. 14, the butterfly valve member 30 is disposed in the pipe section $D^2$ and the pressure take-off pipes $21^a$ –28 and 22–29 are replaced by pipes 15 and 16 which are identical to those shown in FIG. 2 and communicate with each side of the section regulated by the butterfly valve member 30.

These embodiments are of interest in cases where the nominal flows of mixed water are relatively low and where, consequently, the mixer valve is under supplied with respect to its maximum possibilities. It is indeed possible, by a slight closure of the butterfly valve member 30, to obtain a differential pressure which is sufficient on the membrane 14 and arrange that the mixer valve is exactly fully open to the inlet pipe connection 2 when the flow in the radiators is equal to the nominal flow calculated for the system, which flow corresponds to the basic conditions adopted upon agreement between the client and the firm installing the system.

The butterfly valve member 30 is of utility as an additional means for regulating the differential pressure in all the embodiments shown in FIG. 2–12.

Figure 13A:
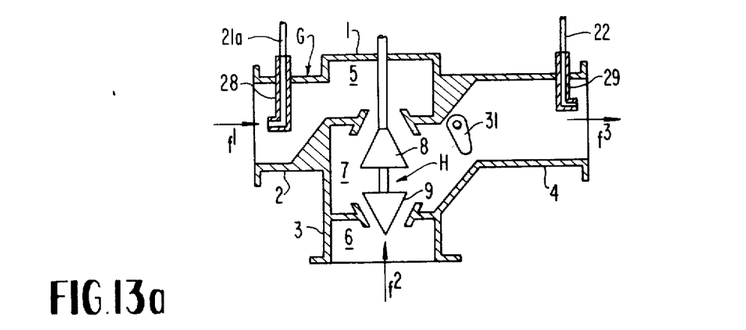

This butterfly valve member 30 may be replaced by a flap 31 which is shown in FIG. 13$a$, is mounted to pivot in the outlet pipe connection 4 in the vicinity of the moving assembly 8–9–10 and which acts as restriction means H.

One of the essential objects in the operation of the system is that, irrespective of the nominal flow of this system, it is required that when the nominal flow is reached, the mixer valve always has a self-defined position, namely the fully open position to the hot water supply from the boiler; the section of opening between the chamber 5 which communicates with the pipe section $D^1$ and the central chamber 7, which section is defined by the valve member 8, must therefore be maximum. In a system having a fixed restriction means such as the diaphragm 18 (FIGS. 2–4) or the venturi 19 (FIGS. 5 and 6), as the nominal flow varies according to the system the desired result is not obtained. The moving assembly 8–9–10 of the mixer valve assumes any position depending, for example, on the stiffness and adjustment of the spring 12. Thus, only the spring can be acted upon.

In order to achieve the required result, it is arranged that when the nominal flow of the system is reached the pressure difference between the pipes 15 and 16 assumes a given known valve governed by the construction of the mixer valve. For this purpose, there is employed a complementary regulating means disposed in the region of the restriction means of the pipe. This regulating means modifies the characteristics of the restriction and achieves the required result. The complementary regulating means is constituted by the butterfly valve member 30 or the flap 31. Owing to this butterfly valve member or flap (FIGS. 13, 13$a$ and 14), it is easy to ensure the adaptation of the mixer valve to the system receiving it. Note that when installing the system, the butterfly valve member 30 or the flap 31 is adjusted by placing it in the best position and then left alone, this position being locked if desired. In any case, the adjustment of the butterfly valve member or flap must be inaccessible to user.

Figure 16:
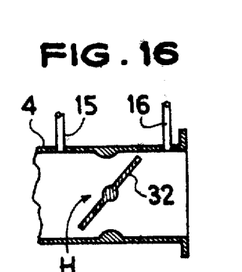
FIG. 16 is a partial sectional view of a modification of the restriction means constituted by a butterfly-valve.

By way of a modification (FIG. 16), instead of providing the restriction means H and a complementary regulating means 30 or 31, a single means 32 is employed which serves both as a restriction means equivalent to the diaphragm 18 shown in FIGS. 2–4 and the venturi 19 shown in FIGS. 5 and 6 and as a complementary regulating means equivalent to the butterfly valve member 30 or flap 31. It is constituted by a butterfly valve member 32 which is placed in the outlet pipe connection 4 between the pressure take-off pipes 15 and 16 and is capable of closing the passage defined by the seat of this valve member. Consequently, as opposed to the butterfly valve member 30 or flap 31 which are not adapted to close the pipe connection 4, the butterfly valve member 32 is dimensioned with respect to its seat in such manner as to be capable of closing this pipe connection. The pipes 15 and 16 must always be located on each side of the butterfly valve member 32 irrespective of its position and are therefore spaced further away from each other than in the embodiment shown in FIG. 14.

Note that the embodiment shown in FIG. 3 enables the diameter of the membranes to be reduced and possibly enables the actuating force on the rod 10 to be increased. This embodiment may be employed in cases where a mixer valve which has a low pressure drop, and therefore a low actuating pressure on the capsule, is required.

It will be understood that the various embodiments which are compatible with each other may also be employed in any possible combination.

Having now described my invention what I claim as new and desire to secure by Letters Patent is:

1. A thermally regulated central heating system comprising a hot fluid generator, radiators, a hot fluid supply pipe connecting the generator to the radiators, a cooled fluid return pipe connecting the radiators to the generator, a three-way mixer valve inserted in the hot fluid supply pipe, a cooled fluid recycling pipe connecting the return pipe to the mixer valve, the mixer valve having means defining a first inlet way, a second inlet way, and an outlet way, means defining a valve aperture associated with said first inlet way and a valve aperture associated with said second inlet way, and valve closure means co-operative with said valve apertures for varying the flow of fluid through the first inlet way valve aperture and the second inlet way valve aperture, control means for controlling the closure means of the mixer valve and responsive to a differential pressure which is a function of the mixed fluid supply flow to the radiators, the mixture valve dividing the supply pipe into a hot fluid supply pipe section connected to said first inlet way and a mixed fluid supply pipe section connected to said outlet way, said mixed fluid supply pipe section and a part of said return pipe upstream of the connection of said recycling pipe to said return pipe forming part of a pipe circuit in which a fluid circulating pump is inserted, restriction means in said mixed fluid pipe section, two pressure take-off pipes connecting said control means to points of said mixed fluid supply pipe section located respectively upstream and downstream of said restriction means, and thermostically controlled flow regulating means inserted in said mixed fluid supply pipe section.

2. A system as claimed in claim 1, wherein the thermostically controlled flow regulating means comprises at an inlet of at least one of the radiators a thermostatic valve.

3. A system as claimed in claim 1, wherein the restriction means is inserted in the mixed fluid supply pipe section in the vicinity of the mixer valve.

4. A system as claimed in claim 1, wherein the restriction means is inserted in said outlet way.

5. A system as claimed in claim 3, wherein the restriction means is a rigid diaphragm.

6. A system as claimed in claim 3, wherein the restriction means is a venturi.

7. A system as claimed in claim 6, wherein one of the two pressure take-off pipes communicates with the upstream side of the venturi and the other of the pressure take-off pipes communicates with the throat of the venturi.

8. A system as claimed in claim 3, wherein the restriction means is a butterfly valve member.

9. A thermally regulated central heating system comprising a hot fluid generator, radiators, a hot fluid supply pipe connecting the generator to the radiators, a cooled fluid return pipe connecting the radiators to the generator, a three-way mixer valve inserted in the hot fluid supply pipe, a cooled fluid recycling pipe connecting the return pipe to the mixer valve, the mixer valve having means defining a first inlet way, a second inlet way, and an outlet way, means defining a valve aperture associated with said first inlet way and a valve aperture associated with said second inlet way, and valve closure means co-operative with said valve apertures for varying the flow of fluid through the first inlet way valve aperture and the second inlet way valve aperture, control means for controlling the closure means of the mixer valve and responsive to a differential pressure which is a function of the mixed fluid supply flow to the radiators, the mixer valve dividing the supply pipe into a hot fluid supply pipe section connected to said first inlet way and a mixed fluid supply pipe section connected to said outlet way, said mixed fluid supply pipe section and a part of said return pipe upstream of the connection of said recycling pipe to said return pipe forming part of a pipe circuit in which a fluid circulating pump is inserted, restriction means in said mixed fluid pipe section, two pressure take-off pipes connecting said control means to points of said mixed fluid supply pipe section located respectively upstream and downstream of said restriction means, and thermostically controlled flow regulating means inserted in said mixed fluid supply pipe section, the restriction means being constituted by the closure means of the mixer valve.

10. A system as claimed in claim 9, wherein one of the two pressure take-off pipes opens onto the second inlet way of the mixer valve, and the other pressure take-off pipe opens onto the outlet way of the mixer valve.

11. A system as claimed in claim 9, wherein one of the pressure take-off pipes opens onto the first inlet way of the mixer valve and the other pressure take-off pipe opens onto the outlet way of the mixer valve.

12. A system as claimed in claim 9, wherein the control means of the closure member of the mixer valve comprise two chambers, a movable partition wall located between the two chambers, a rod supporting the closure means and integral with the partition wall, the upstream pressure take-off pipe being constituted by an axial passage in the rod.

13. A system as claimed in claim 9, wherein the control means of the closure member of the mixer valve comprise two chambers, a movable partition wall located between the two chambers, a rod supporting the closure means and integral with the partition wall, one of the chambers of the control means having a second wall which also partly defines an inlet chamber of the mixer valve and the upstream pressure take-off pipe being constituted by an opening formed in said second wall.

14. A system as claimed in claim 10, wherein the control means of the closure member of the mixer valve comprise two chambers, a movable partition wall located between the two chambers, a rod supporting the closure means and integral with the partition wall, the upstream pressure take-off pipe being constituted by an axial passage in the rod, the upstream pressure take-off pipe opening onto said second inlet way of the mixer valve.

15. A system as claimed in claim 11, wherein the upstream pressure take-off pipe opens onto said first inlet way of the mixer valve.

16. A system as claimed in claim 12, wherein the upstream pressure take-off pipe opens onto said second inlet way after having passed through the associated valve closure means.

17. A system as claimed in claim 12, wherein the upstream pressure take-off pipe opens onto said first inlet way through lateral orifices in the upstream pressure take-off pipe.

18. A system as claimed in claim 1, wherein the pressure take-off pipes terminate in cranked tubes which open onto an axis of flow of the fluid through the mixer valve from said first inlet way to said outlet way.

19. A system as claimed in claim 2, comprising a complementary differential pressure regulating means disposed between the closure means of the mixer valve and the downstream pressure take-off pipe.

20. A system as claimed in claim 19, wherein the complementary pressure differential regulating means is a butterfly valve member.

21. A system as claimed in claim 19, wherein the complementary pressure differential regulating means is a flap.

22. A system as claimed in claim 20, wherein the same butterfly valve member acts as both restriction means and complementary means regulating the differential pressure.

* * * * *